Dec. 19, 1950     H. HACKLANDER ET AL     2,534,593
BONDING MACHINE
Filed June 21, 1945     3 Sheets-Sheet 1
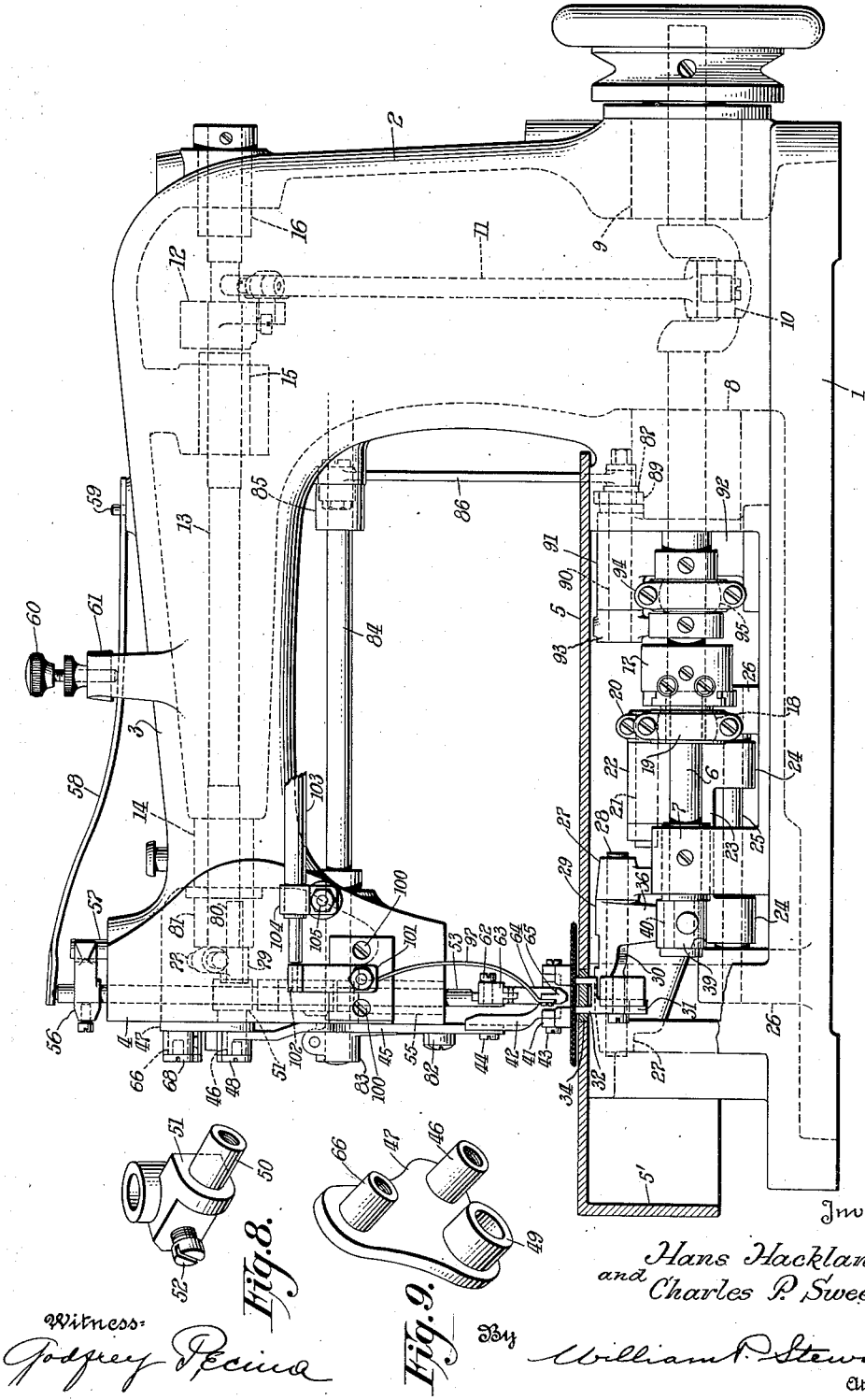
Inventor
Hans Hacklander
and Charles P. Sweeny
By William P. Stewart
Attorney

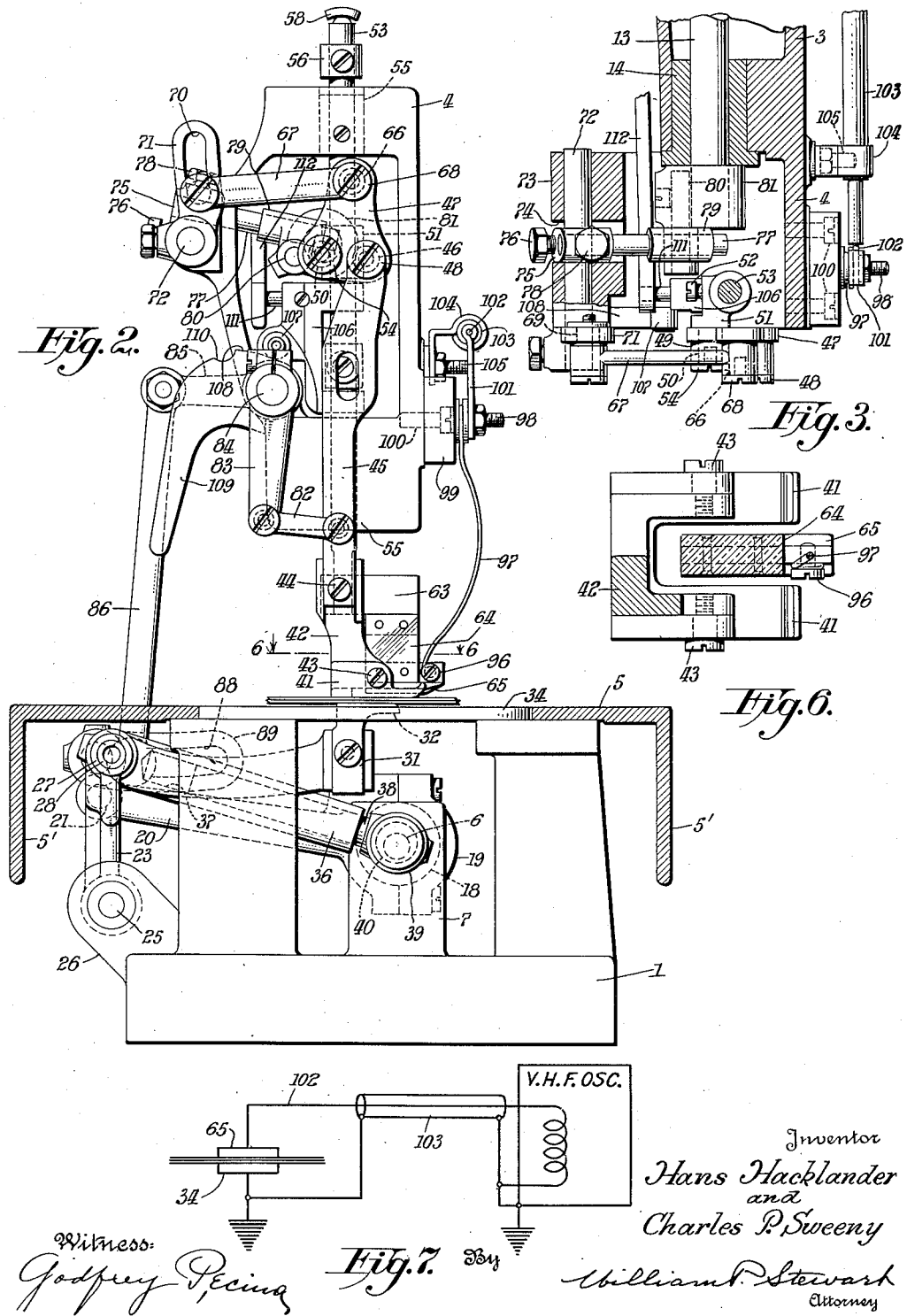

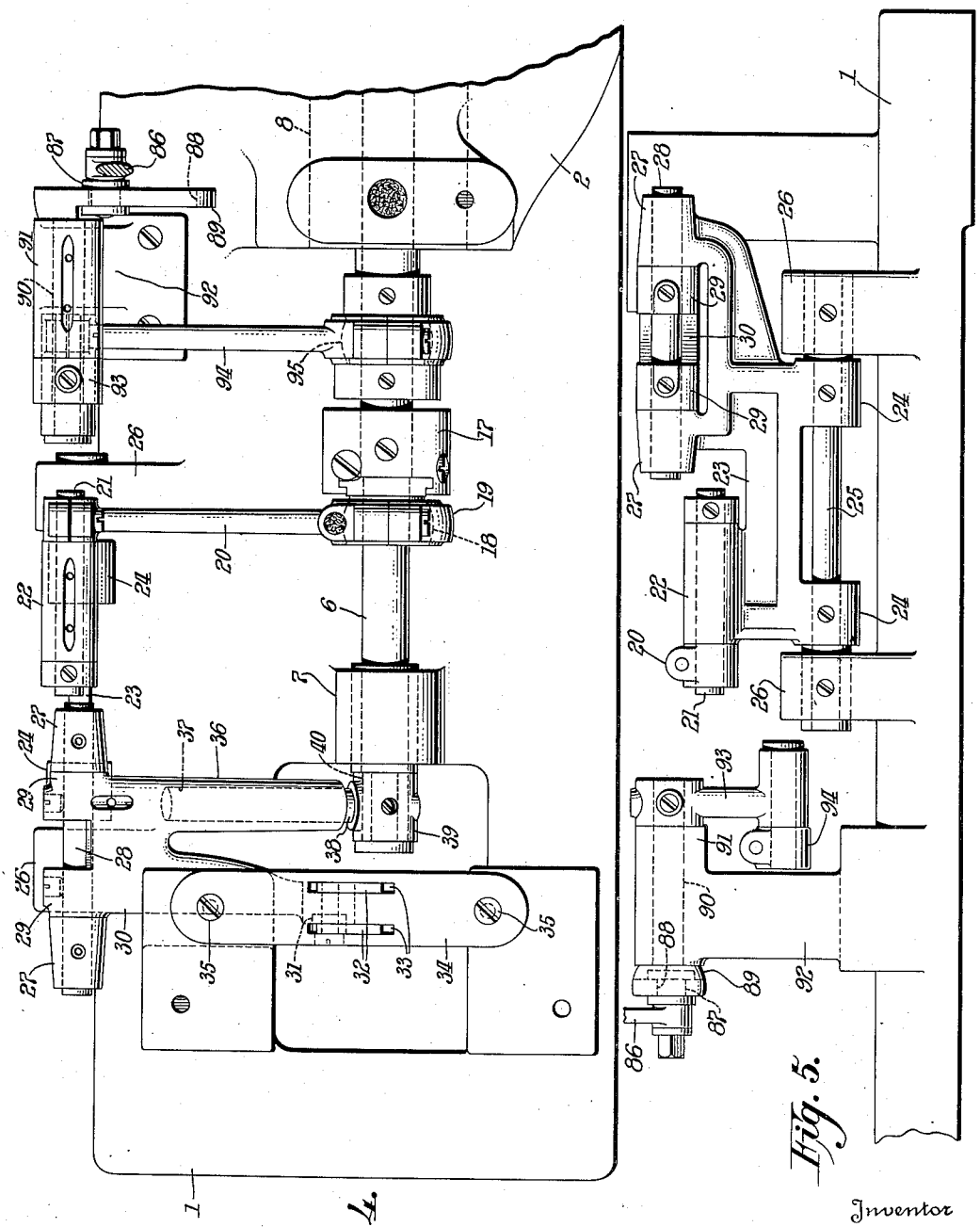

Patented Dec. 19, 1950

2,534,593

UNITED STATES PATENT OFFICE 2,534,593

BONDING MACHINE

Hans Hacklander, Linden, and Charles P. Sweeny, Sommerville, N. J., assignors to The Singer Manufacturing Company, Elizabeth, N. J., a corporation of New Jersey Application June 21, 1945, Serial No. 600,788

5 Claims. (Cl. 219—47)

This invention relates to apparatus for forming a continuous bonded seam in work-plies of sheet materials by the use of very high frequency electric current, and is adapted for embodiment in apparatus for bonding plies of thermoplastic or thermosetting materials, as well as for use in uniting work-plies by means of adhesives having thermoplastic properties.

The primary object of the present invention is to provide improved means for progressively bonding sheet materials by the use of high frequency electric current; thereby to increase production and improve the quality of the product.

Another object of this invention is to provide an electrostatic bonding apparatus having improved means for progressively advancing superposed work-plies in unison through a bonding zone to form a continuous seam.

Other and more specific objects of the invention will be apparent from the following description and claims.

The invention comprises the devices, combinations and arrangements of parts hereinafter described in connection with the accompanying drawings, which illustrate a preferred embodiment of the invention and in which:

Fig. 1 is a front side elevation, partly in section, of a bonding machine forming a portion of the bonding apparatus and embodying the invention. Fig. 2 is a front end elevation, partly in section, of the machine. Fig. 3 is a top plan view, partly in section, of the mechanism at the free end of the bracket-arm of the machine. Fig. 4 is a top plan view of the bed, partly broken away, of the machine. Fig. 5 is a fragmentary rear side elevation of the bed-mechanism of the machine. Fig. 6 represents a cross-section of the upper feeding-element and electrode-carrier, the section being taken substantially on the line 6—6 of Fig. 2. Fig. 7 is a diagrammatic illustration of the electrical connections between an oscillator of very high frequency and the electrodes. Fig. 8 is a perspective view of the electrode-bar collar which supports the fulcrum-plate. Fig. 9 is a perspective view of the fulcrum-plate connecting the electrode-bar and upper feed-bar.

Referring to the drawings, the invention is shown as embodied in a bonding machine having a frame comprising a bed 1, from one end of which rises a hollow standard 2 of an overhanging bracket-arm 3 terminating at its free end in a head 4. Suitably secured upon the bed 1 is a flat work-supporting plate 5 having depending aprons 5' housing the bed mechanism.

Extending horizontally lengthwise of the bed 1 is a rotary main-shaft 6 which may be driven in any suitable manner and is rotatably journaled in bearings 7, 8 and 9 provided upon the bed 1. The main-shaft 6 has a crank 10 connected to one end of a pitman 11 extending upwardly through the hollow bracket-arm standard 2. At its upper end, the pitman 11 is pivotally connected to a crank-arm 12 suitably secured upon a rock-shaft 13 disposed substantially parallel to the main-shaft 6. The rock-shaft 13 extends lengthwise of the bracket-arm 3 and is journaled in suitable bearings 14, 15 and 16 provided within the bracket-arm.

Secured upon the main-shaft 6 is a collar 17, which adjustably and in a well known manner carries a feed-advance eccentric 18. The eccentric 18 is embraced by a split strap 19 at one end of a pitman 20 extending rearwardly from the main-shaft 6. At its rearward end, the pitman 20 is clamped upon one end of a horizontally disposed pivot-pin 21 journaled in an apertured boss 22 of an upstanding feed-advance rocker-frame 23. The rocker-frame 23 is formed with laterally spaced depending bosses 24 having alined apertures for receiving a fulcrum-shaft 25 disposed substantially parallel to the main-shaft 6. At its opposite ends, the fulcrum-shaft 25 is suitably journaled in bearing-lugs 26 rising from the bed-plate 1.

Adjacent the boss 22 thereof, the rocker-frame 23 is formed as a yoke providing laterally spaced bosses 27 having alined apertures in which is journaled a pivot-pin 28. Suitably secured upon the pivot-pin 28, between the rocker-frame bosses 27, are laterally spaced ears 29 formed upon the rearward end of a lower feed-bar 30. Secured upon the forward end of the feed-bar 30 is the shank of a lower four-motion feed-element 31 of a clamp-feed mechanism. The feed-element 31 has two laterally spaced work-engaging sections 32 which are preferably flat at the top and which operate through laterally spaced feed-slots 33 provided in a horizontally disposed lower electrode-plate 34; the electrode-plate 34 being secured at its opposite ends, by screws 35, upon suitable lugs rising from the bed 1.

Integral with the feed-bar 30 is a forwardly extending and downwardly inclined arm 36. The arm 36 has a longitudinal bore 37 providing a socket entered by a slide-pin 38 having, at its forward end, a strap 39 embracing a feed-lift eccentric or crank-pin 40 at one end of the main-shaft 6.

From the foregoing description, it will be understood that rocking movements of variable amplitude are imparted to the rocker-frame 23 from the feed-advance eccentric 18, thereby transmitting work-advancing and return movements to the lower feed-element 31. The feed-lift eccentric 40 acts through the slide-pin 38 to swing the feed-bar 30 up and down about the pivot-pin 28, thereby imparting rising and falling movements to the feed-element 31, 32.

Opposed to the lower feed-element sections 32 are the laterally spaced work-engaging sections or foot-plates 41 of an upper four-motion feed-element 42. The foot-plates 41 are preferably integrally formed and are pivotally secured by alined pivot-screws 43 upon the lower end of the feed-element 42. The feed-element 42 is attached by a screw 44 to the lower end of a vertically disposed upper feed-bar 45. At its upper end, the feed-bar 45 is hung upon a pivot-stud 46 extending laterally from a fulcrum-plate 47; the feed-bar 45 being held on the pivot stud 46 by a screw 48 threaded into said pivot-stud.

The fulcrum-plate 47 has a lateral boss 49 which is longitudinally apertured to receive a fulcrum-stud 50 extending from a collar 51 secured by a screw 52 upon a vertically disposed electrode-bar 53. The fulcrum-plate 47 is retained upon the fulcrum-stud 50 by a screw 54 threaded into the fulcrum-stud. The electrode-bar 53 is journaled for endwise reciprocation in vertically spaced bearings 55 provided in the bracket-arm head 4. A collar 56 suitably secured upon the upper end of the electrode-bar 53 is forked to embrace a guide-pin 57 rising from the head 4, whereby the electrode-bar 53 is restrained against turning about its longitudinal axis. Bearing downwardly upon the upper end of the electrode-bar 53 is an end of a spring 58, of which the opposite end is anchored by a pin 59 to the bracket-arm 3. Intermediate its ends, the spring 58 is engaged by a pressure-adjusting screw 60 threaded into a lug 61 rising from the bracket-arm 3.

Attached by a screw 62 to the lower end of the electrode-bar 53 is a collar 63; and rigidly depending from the collar 63 is a block 64 of suitable insulating material, such as polystyrene. The insulating block 64 is slotted at its lower end to receive the reduced shank of an upper electrode 65 riveted to the block and opposed to the lower electrode-plate 34. The electrode 65 preferably has downwardly convergent side walls to provide a narrow work-contacting face; said electrode being inclined upwardly towards its front end or toe to facilitate introduction of the work between the electrodes. As illustrated in Figs. 1 and 6, the electrode 65 is disposed substantially medianly between the foot-plates 41 of the upper feed-element. As also illustrated in Fig. 6 the foot-plates 41 of the upper feed-element are connected rearwardly of the electrode 65. Consequently, the upper feed-element functions to engage and feed the work directly rearwardly of the electrode 65 as well as at opposite sides thereof.

The fulcrim-plate 47, which is pivotally connected to the electrode-bar 53, has another pivot-stud 66 pivotally embraced by one end of a link 67 held on said pivot-stud 66 by a screw 68. At its opposite end, the link 67 is pivotally connected to a slide-block 69 adjustably secured in a segmental slot 70 formed in an upstanding crank-arm 71 suitably secured upon a short rock-shaft 72. The rock-shaft 72 is disposed substantially parallel to the bracket-arm rock-shaft 13 and is suitably journaled in a bearing-lug 73 extending rearwardly from the bracket-arm head 4. The bearing-lug 73 is provided with a transverse slot 74 affording clearance for a collar 75 secured upon the rock-shaft 72 by a screw 76. The collar 75 is apertured to receive a slide-pin 77 which is rigidly secured to the collar 75 by a screw 78; said slide-pin 77 extending forwardly from the collar 75 and transversely of the rock-shaft 72. The slide-pin 77 is telescopically disposed in a sleeve 79 pivotally carried by a crank-pin 80 suitably secured to a crank-disk 81 mounted upon one end of the rock-shaft 13. Oscillatory movements of the rock-shaft 13 are, therefore, transmitted by the interfitted sleeve 79 and slide-pin 77 to the rock-shaft 72, and by the latter through the crank-arm 71 and link 67 to the fulcrum-plate 47. The amplitude of movement imparted to the fulcrum-plate 47 may be varied by adjustment of the slide-block 69 lengthwise of the crank-arm slot 70.

Adjacent its lower end, the feed-bar 45 is pivotally connected by a link 82 to the free end of a crank-arm 83 depending from one end of a horizontal feed-advance rock-shaft 84 disposed substantially parallel to the main-shaft 6. The rock-shaft 84 is journaled in suitable bearings provided at the rear side of the bracket-arm 3. Adjacent its opposite end, the rock-shaft 84 is provided with a rearwardly extending crank-arm 85 operatively connected to the upper end of a vertically disposed link 86. The lower end of the link 86 is pivotally connected to a slide-block 87 adjustably secured in a guideway provided by a segmental slot 88 formed in a crank-arm 89. The crank-arm 89 extends forwardly from and is suitably secured upon one end of a fulcrum-pin 90 journaled in a horizontally apertured bearing-boss 91 formed at the upper end of a lug 92 rising from the bed 1. The opposite end of the fulcrum-pin 90 is provided with a depending crank-arm 93 pivotally connected to the rearward end of a pitman 94. At its forward end, the pitman 94 has a strap embracing an auxiliary feed-advance eccentric 95 suitably secured upon the main-shaft 6. The provision for adjustment of the slide-block 87 lengthwise of the crank-arm, and the provision for adjustment of the eccentricity of the lower feed actuating eccentric 18 affords means for regulating the work-advancing strokes of the lower feed-element 31, 32 and the upper feed-element 41, 42 so that said feed-elements cooperate in the desired manner to advance the work. If preferred, an adjustable feed-advance eccentric similar to the eccentric 18, or some other suitably adjustable eccentric, could be substituted for the auxiliary feed-advance eccentric 95.

Upon operation of the machine the oscillatory movements of the bracket-arm rock-shaft 13, derived from the rotating main-shaft 6, are transmitted through the operative connections 79, 77, 72, 71 and 67 to the fulcrum-plate 47 which is pivotally mounted on the electrode-bar 53. When the electrode-bar 53 is in its lowest position, with the upper electrode 65 in engagement with the work, the forward movement of the link 67 causes the fulcrum-plate 47 to swing forwardly about the fulcrum-stud 50, thereby lowering the upper feed-element 42 into engagement with the work. In the continued forward movement of the fulcrum-plate 47, the fulcrum of said fulcrum-plate is shifted from the fulcrum-stud 50 to the pivot-stud 46, whereby the electrode-bar 53 is slightly lifted to raise the upper electrode 65 clear of the work.

In the rearward or return stroke of the link 67, the fulcrum-plate 47 initially swings about the pivot-stud 46, thereby lowering the upper electrode 65 into engagement with the work. The fulcrum of the fulcrum-plate 47 then automatically shifts back to the fulcrum-stud 50, whereby the upper feed-element 42 is lifted clear of the work. Consequently, the feed-bar 45 and the electrode-bar 53 are reciprocally actuated toward and from the work-support to cause the feed-element 42 and the electrode 65 alternately to engage the work.

The described connections between the feed-bar 45 and the auxiliary feed-advance eccentric 95 operate to swing the feed-bar 45 rearwardly about the pivot-stud 46 when the feed-element 42 engages the work and to swing said feed-bar forwardly when the feed-element is lifted clear of the work. These movements of the feed-element 42 are timed with the work-advancing and return movements of the lower feed-element 31 to effect positive clamp feeding of superimposed work-plies by said feed-elements, whereby slippage of said plies relatively to each other is obviated.

It will be observed that the electrode-bar 53 and upper feed-bar 45 are urged downwardly by the action of the spring 58 and that the upper electrode 65 and upper feed-element 42 are arranged abreast of each other in the line of feed. This construction varies the reciprocatory zone of action of both the electrode-bar 53 and the upper feed-bar 45 in accordance with the variation in thickness of the material being acted upon. As an example, if an increased thickness, such as a cross-seam, is encountered by the upper feed-element 42, the pivot-stud 46 will not descend as far as it would have if thin material were under the feed-element 42, and as the throw of the link 67 is constant, the electrode 65 will be raised substantially the same distance above the material of the cross-seam as it would be raised if the material were thin. As the fulcrum point of the fulcrum plate 47 alternately shifts between the pivot-stud 46 and the fulcrum-stud 50, the upper feed-element 42 is also always raised the same distance above the upper surface of the material being acted upon. These constructive features permit the upper electrode 65 and the upper feed-element 42 to float up and down and conform to variations in thickness of the work and, at the same time, maintain a substantially fixed amplitude of rising and falling or reciprocatory movements.

Connected to the upper electrode 65, by a screw 96, is one end of a flexible conductor 97. The other end of the conductor 97 is suitably secured to a binding-post 98 carried by a block 99 of suitable insulating material, such as polystyrene; said block 99 being secured by screws 100 to the front wall of the bracket-arm head 4. In current-transmitting connection with the conductor 97 is a connector-strap 101 to which is attached the inner conductor 102 of a tuned coaxial cable 103. Clamped upon the outer conductor of the cable 103 is a current-transmitting clamp 104 secured by a bolt 105 to the bracket-arm head 4, whereby the outer conductor of the cable 103 is grounded upon the machine frame to which the lower electrode-plate 34 is secured.

As illustrated in Fig. 7 of the drawings, the cable 103 is suitably connected to an oscillator of the very high frequency or VHF type. The Federal Communications Commission has officially adopted the designation "very high frequency" as indicating a frequency range from thirty to three hundred megacycles and the reference in this application to very high frequency is to be understood as meaning a frequency within the above noted range.

It will be understood from the foregoing description that an electrostatic field of very high frequency will be established in the zone of the electrodes 65 and 34, and that work-plies to be bonded are progressively advanced through said field or zone by the feeding mechanism of the machine. The work-plies may comprise thermoplastic materials which in themselves have the characteristic of becoming softened and welded together when passed between the relatively reciprocating electrodes, or the work-plies may have placed therebetween a suitable adhesive having similar characteristics of being responsive to an electrostatic field of very high frequency.

Provision is made for together lifting the feed-element 41 and the electrode 65, against the action of the spring 58, for work-insertion and removal purposes. To this end, a lifter-block 106 is mounted upon the electrode-bar 53 for limited sliding movement endwise of said bar; the upward movement of the block 106 being limited by the collar 51. The block 106 carries a roller 107 engaged by the cam-edge 108 of a hand-operated lifter-lever 109 suitably fulcrumed upon the bracket-arm head 4. Preferably, the cam-edge 108 of the lifter-lever 109 is provided with a notch 110 for predetermining the raised positions of the feed-element 41 and electrode 65.

The lifter-block 106 is additionally provided with a pin 111 positioned for engagement by a treadle-actuated lifter-lever 112, which latter is only partly illustrated in the drawings and may be of any suitable construction.

Having thus set forth the nature of the invention, what we claim herein is:

1. In an electrostatic bonding machine, in combination, a movable electrode, an electrode-bar carrying said movable electrode and confined to right line movements, a feed-element, a feed-bar carrying said feed-element, a fulcrum-plate pivotally mounted upon said electrode-bar and pivotally supporting said feed-bar, means for rocking said fulcrum-plate for imparting reciprocal movements to said movable electrode and feed-element, means for imparting work-advancing and return movements to said feed-element, a second electrode opposed to said movable electrode, and means for establishing an electrostatic field of very high frequency between said electrodes.

2. In an electrostatic bonding machine, in combination, a pair of opposed electrodes providing a bonding zone, means for establishing an electrostatic field of very high frequency in said bonding zone, an electrode-bar carrying one of said electrodes and confined to right line reciprocation, means including a feed-element for progressively advancing superimposed work-plies through said bonding zone, a fulcrum-plate pivotally mounted upon said electrode-bar and pivotally connected with said feed-element, an actuating shaft, operative connections with said shaft for rocking said fulcrum-plate and thereby reciprocally actuating said electrode-bar and feed-element, said operative connections including means for relatively varying the amplitude of movement imparted thereby to said electrode-bar and feed-element, and means for imparting work-advancing and return movements to said feed-element.

3. In an electrostatic bonding machine, in combination, a work-support, an upper movable electrode, an electrode-bar carrying said movable electrode and confined to right line movements in a fixed path toward and away from said work-support, an upper feed-element, a feed-bar carrying said feed-element, means for imparting work-advancing and return movements to said feed-bar, a spring biasing one of said bars toward said work-support, fulcrum means interconnecting said two bars, oscillating means connected with said fulcrum means thereby to rock it alternately in opposite directions to cause it alternately to depress said electrode and feed elements into contact with work located on said work-support and alternately to lift said feed and electrode elements away from said work-support, said fulcrum means in its rocking movements serving to transfer to the depressed feed or electrode element the full spring pressure, a second electrode opposed to said movable electrode, and means for establishing an electrostatic field of very high frequency between said electrodes.

4. In an electronic seaming machine for forming a continuous bonded seam in dielectric material, in combination, a work-support providing a stationary electrode, an upper movable electrode, an electrode-bar carrying said movable electrode and confined to right line movements in a fixed path toward and away from said work-support, spring means for biasing said electrode-bar toward said work-support, means for periodically lifting said electrode-bar away from said work-support against the action of said spring means, means for establishing a high frequency electrical field between said electrodes, an upper feed-element, a feed-bar carrying said feed-element, means for imparting work-advancing and return movements to said feed-bar, and a fulcrum element connecting said feed-bar with said electrode-bar for automatically causing said feed element in response to the movements of said electrode-bar to move into and out of engagement with the work carried by said work-support alternately relative to said movable electrode.

5. In an electrostatic bonding machine, in combination, a movable electrode, an electrode-bar carrying said movable electrode and confined to right line movements in a fixed path, a feed-element, a feed-bar carrying said feed-element, a fulcrum-plate pivotally secured to each of said two bars, means for rocking said fulcrum-plate for imparting alternate reciprocal movements to said movable electrode and feed-element, means for imparting work-advancing and return movements to said feed-element, a second electrode opposed to said movable electrode, and means for establishing an electrostatic field of very high frequency between said electrodes.

HANS HACKLANDER.
CHARLES P. SWEENY.

REFERENCES CITED

The following references are of record in the file of this patent:

UNITED STATES PATENTS

| Number | Name | Date |
|---|---|---|
| 989,538 | Rontke | Apr. 11, 1911 |
| 1,097,864 | Knopf et al. | May 26, 1914 |
| 1,661,572 | MacDonald | Mar. 6, 1928 |
| 1,675,696 | Clayton | July 3, 1928 |
| 1,725,929 | Newton | Aug. 27, 1929 |
| 2,119,316 | Clayton | May 31, 1938 |
| 2,322,293 | Johnston | June 22, 1943 |
| 2,329,484 | Quist | Sept. 14, 1943 |
| 2,339,240 | Clayton | Jan. 18, 1944 |
| 2,354,714 | Strickland, Jr. | Aug. 1, 1944 |
| 2,355,189 | Tozier | Aug. 8, 1944 |
| 2,432,412 | Hacklander | Dec. 9, 1947 |

OTHER REFERENCES

Article entitled "An Electronic Sewing Machine," from the magazine "Electronics" for August 1943, pages 90-93, 160, 162, 164, 166, 168.